(12) United States Patent
Collins

(10) Patent No.: US 9,191,588 B2
(45) Date of Patent: Nov. 17, 2015

(54) HIGH DYNAMIC RANGE PIXEL

(75) Inventor: Steve Collins, Oxford (GB)

(73) Assignee: ISIS INNOVATION LIMITED, Summertown, Oxford (GB)

( * ) Notice: Subject to any disclaimer, the term of this patent is extended or adjusted under 35 U.S.C. 154(b) by 770 days.

(21) Appl. No.: 13/510,123

(22) PCT Filed: Nov. 22, 2010

(86) PCT No.: PCT/GB2010/002153
§ 371 (c)(1),
(2), (4) Date: Jul. 24, 2012

(87) PCT Pub. No.: WO2011/064532
PCT Pub. Date: Jun. 3, 2011

(65) Prior Publication Data
US 2012/0280112 A1    Nov. 8, 2012

(30) Foreign Application Priority Data
Nov. 26, 2009    (GB) .................................. 0920750.7

(51) Int. Cl.
*H01L 27/146* (2006.01)
*H01L 31/02* (2006.01)
(Continued)

(52) U.S. Cl.
CPC ......... *H04N 5/3535* (2013.01); *H04N 5/35509* (2013.01); *H04N 5/35554* (2013.01); *H04N 5/37452* (2013.01)

(58) Field of Classification Search
CPC ............ H04N 5/3535; H04N 5/35554; H04N 5/37452; H04N 5/35509; H04N 5/35518; H04N 5/37455; H04N 3/155; H04N 3/1556; H04N 5/355; H04N 5/353; H04N 5/351
See application file for complete search history.

(56) References Cited

U.S. PATENT DOCUMENTS 6,069,377 A * 5/2000 Prentice et al. ............... 257/292
6,606,121 B1 * 8/2003 Bohm et al. .................. 348/297
(Continued)

FOREIGN PATENT DOCUMENTS

GB        2460260        11/2009
GB        2460260 A  *  11/2009   ............... H04N 3/15
(Continued)

OTHER PUBLICATIONS

International Search report issued in corresponding PCT Application No. PCT/GB2010/002153 on Feb. 8, 2011.
(Continued)

*Primary Examiner* — John Lee
(74) *Attorney, Agent, or Firm* — Knobbe, Martens, Olson & Bear, LLP

(57) ABSTRACT

A high dynamic range pixel (2) includes a photosensor device (4) for detecting incident light, said photosensor having a photosensor output (14) for a photosensor signal $V_p$ that represents a time integral of the detected light intensity over an integration period. A transistor disconnect switch (8) has a first switch input (15) that is connected to the photosensor output (14), a second switch input (17) that is connected to receive a time-dependent reference signal $V_{ref}$, and a switch output (16) for a switch output signal $V_s$ that is switchably connected to the first switch input. The disconnect switch (8) is constructed and arranged to disconnect the switch output (16) from the first switch input (15) at a capture moment that depends on the relative values of input signals at the first and second switch inputs (15,18). A readout circuit (10) is connected to the switch output (16) and arranged to capture the switch output signal $V_s$ at the capture moment and provide an output signal $V_{out}$ that is related to the switch output signal $V_s$. The first switch input (15) is connected additionally to an input (29) for a time-dependent applied signal $V_{app}$, such that the input signal at the first switch input (15) is the sum of the photosensor signal $V_p$ and the applied signal $V_{app}$.

14 Claims, 4 Drawing Sheets

(51) Int. Cl.
*H04N 5/335* (2011.01)
*H04N 5/353* (2011.01)
*H04N 5/355* (2011.01)
*H04N 5/3745* (2011.01)

(56) References Cited

U.S. PATENT DOCUMENTS

| | | | |
|---|---|---|---|
| 7,495,271 B2* | 2/2009 | Hagihara et al. | 257/290 |
| 7,616,242 B2* | 11/2009 | Ando et al. | 348/301 |
| 7,880,788 B2* | 2/2011 | Kamiyama et al. | 348/308 |
| 8,106,982 B2* | 1/2012 | Collins | 348/308 |
| 2003/0001080 A1* | 1/2003 | Kummaraguntla et al. | 250/214.1 |
| 2003/0076432 A1* | 4/2003 | Luo et al. | 348/308 |
| 2003/0234345 A1* | 12/2003 | Tecchiolli et al. | 250/214 R |
| 2004/0036785 A1* | 2/2004 | Takayanagi | 348/308 |
| 2004/0233313 A1* | 11/2004 | Ando et al. | 348/308 |
| 2005/0269488 A1* | 12/2005 | King et al. | 250/214 R |
| 2009/0051798 A1* | 2/2009 | Takayanagi | 348/308 |
| 2012/0280112 A1* | 11/2012 | Collins | 250/208.1 |

FOREIGN PATENT DOCUMENTS

| | | |
|---|---|---|
| WO | WO 2007/051964 A1 | 5/2007 |
| WO | WO 2009/025223 | 2/2009 |
| WO | WO 2009/141590 A2 | 11/2009 |

OTHER PUBLICATIONS

Search Report issued in corresponding GB Application No. 0920750.7 on Jan. 27, 2010.

Written Opinion in corresponding PCT Application No. PCT/GB2010/002153 (Aug. 2, 2011).

* cited by examiner

HIGH DYNAMIC RANGE PIXEL

RELATED APPLICATIONS

This application is the U.S. National Phase filing under 35 U.S.C. §371 of PCT/GB2010/002153, filed Nov. 22, 2010, which designated the United States and was published in English, which claims priority under 35 U.S.C. §119(a)-(d) to Great Britain Patent Application No. 0920750.7, filed Nov. 26, 2009, the content of which is incorporated herein by reference in its entirety.

FIELD OF THE INVENTION

The present invention relates to a high dynamic range pixel and to a method of sensing using a high dynamic range pixel. The invention also relates to a sensor that includes an array of high dynamic range pixels. In particular, but not exclusively, the invention relates to an integrating logarithmic pixel with improved low light performance.

The term "pixel" as used herein refers to an individual photosensor in an image sensor, for example a CMOS imager, comprising an array of photosensors. A high dynamic range (HDR) pixel is one that is sensitive to a very wide range of light intensities, for example exceeding 100 dB.

BACKGROUND OF THE INVENTION

A typical three-transistor pixel consists of a photodetector, a reset gate, a selection gate and a source-follower transistor. The selection gate and the source-follower transistor are part of a readout circuit, which may include additional components that are shared with other pixels. In use, the photocurrent flowing through the photodetector charges or discharges a capacitance. The voltage stored on the capacitance at the end of a predetermined integration time is detected and represents the intensity of the light falling on the photodetector.

A fundamental problem with conventional imagers results from the fact that the photocurrent is converted to a voltage by integrating the photo-generated charge onto a capacitor. There is a conflict between the desire for a large capacitance to store the photo-generated charge when there is plenty of light and the need for a small capacitance to obtain a high sensitivity in low light conditions.

One method of capturing a HDR image and recording it with a comparatively small number of bits per pixel is to use an image sensor that has a logarithmic output. A high dynamic range pixel having a user-defined response that may provide for example a logarithmic output or another non-linear monotonic output is described in the inventor's international patent application WO20071051964A. This pixel resolves some of the problems associated with earlier pixels. The logarithmic output allows the image sensor to image a scene with a high dynamic range without the pixel output voltage becoming saturated at high photocurrents. The user is able to control the response of the pixel and, as the conversion to a logarithmic value takes place within the pixel, it is very quick and does not significantly increase the cost of the pixel.

However, one limitation of this pixel is that at very low photocurrents it may be unable to provide a logarithmic response. This is because operation of the pixel depends on reducing the effective integration time and at very low photocurrents the pixel may not be discharged sufficiently within the maximum integration time to create a logarithmic response.

It is therefore an object of the present invention to provide a high dynamic range pixel that mitigates one or more of the aforesaid disadvantages.

SUMMARY OF THE INVENTION

According to the present invention there is provided a high dynamic range pixel including a photosensor device for detecting incident light, said photosensor having a photosensor output for a photosensor signal $V_p$ that represents a time integral of the detected light intensity over an integration period, a transistor disconnect switch having a first switch input that is connected to the photosensor output, a second switch input that is connected to receive a time-dependent reference signal $V_{ref}$, and a switch output for a switch output signal $V_s$ that is switchably connected to the first switch input, the disconnect switch being constructed and arranged to disconnect the switch output from the first switch input at a capture moment that depends on the relative values of input signals at the first and second switch inputs, and a readout circuit connected to the switch output and arranged to capture the switch output signal $V_s$ at the capture moment and provide an output signal $V_{out}$ that is related to the switch output signal $V_s$; characterised in that the first switch input is connected additionally to an input for a time-dependent applied signal $V_{app}$, such that the input signal at the first switch input is the sum of the photosensor signal $V_p$ and the applied signal $V_{app}$.

This pixel is able to provide a user-defined response, for example a logarithmic response, a tone-mapping response or another monotonic non-linear response, over a wide range of photocurrents, including very low photocurrents. The problems of the prior art pixel in handling very low photocurrents are thus avoided.

Advantageously, the first switch input is connected to a signal generator for generating the time-dependent applied signal $V_{app}$. The applied signal $V_{app}$ may be positive or negative, depending on whether the photosensor current charges or discharges the pixel capacitance.

Advantageously, the first switch input is coupled to the signal generator via a capacitance $C_{add}$. The capacitance couples the applied voltage signal $V_{app}$ onto the integrating node, such that the voltage signal detected at the disconnect switch is the sum of the photosensor signal $V_p$ and a fraction of the applied signal $V_{app}$.

Advantageously, the time-dependent applied signal $V_{app}$ is selected such that the effect of the applied signal $V_{app}$ on the actual photosensor signal $V_p$ at the integrating node corresponds to the shortfall between the actual photosensor signal $V_p$ and a desired photosensor signal that represents a user-defined response to the intensity of light falling on the photosensor. The user-defined response may for example be a logarithmic response, a tone mapping response or another non-linear monotonic response.

In a preferred embodiment, the magnitude of the time-dependent applied signal $V_{app}$ is substantially zero during an initial part of each integration period, and non-zero in a later part of each integration period. The applied signal $V_{app}$ may for example have a form substantially as depicted in FIG. 5 of the accompanying drawings.

The disconnect switch is preferably a MOSFET transistor.

Advantageously, the second switch input is connected to a second signal generator for generating the time-dependent reference signal $V_{ref}$.

According to another aspect of the present invention there is provided a image sensor including an array of high dynamic range pixels according to any one of the preceding claims.

According to another aspect of the present invention there is provided a method of sensing using a high dynamic range pixel comprising a photosensor having a photosensor output, a disconnect switch having a first switch input that is connected to the photosensor output, a second switch input and a switch output, and a readout circuit connected to the switch output, the method including the steps of detecting incident light with the photosensor and generating a photosensor signal $V_p$, generating a reference signal $V_{ref}$, comparing the photosensor signal and the reference signal, determining a capture moment from the comparison and capturing an output signal; characterised by supplying to the first switch input a time-dependent applied signal $V_{app}$, such that the input signal at the first switch input is the sum of the actual photosensor signal $V_p$ and the applied signal $V_{app}$.

Advantageously, the time-dependent applied signal $V_{app}$ is supplied to the first switch input via a capacitance $C_{add}$.

Advantageously, the time-dependent applied signal $V_{app}$ is selected such that the effect of the applied signal $V_{app}$ on the actual photosensor signal $V_p$ at the integrating node corresponds to the shortfall between the actual photosensor signal $V_p$ and a desired photosensor signal that represents the voltage required to generate a logarithmic response within a user-defined target time.

Advantageously, the predefined target time is a monotonic function of the photocurrent.

Advantageously, the magnitude of the time-dependent applied signal $V_{app}$ is substantially zero during an initial part of each integration period, and non-zero in a later part of each integration period.

An embodiment of the invention will now be described, by way of example, with reference to the accompanying drawings, in which:

DETAILED DESCRIPTION OF THE PREFERRED EMBODIMENT

Figure 1:
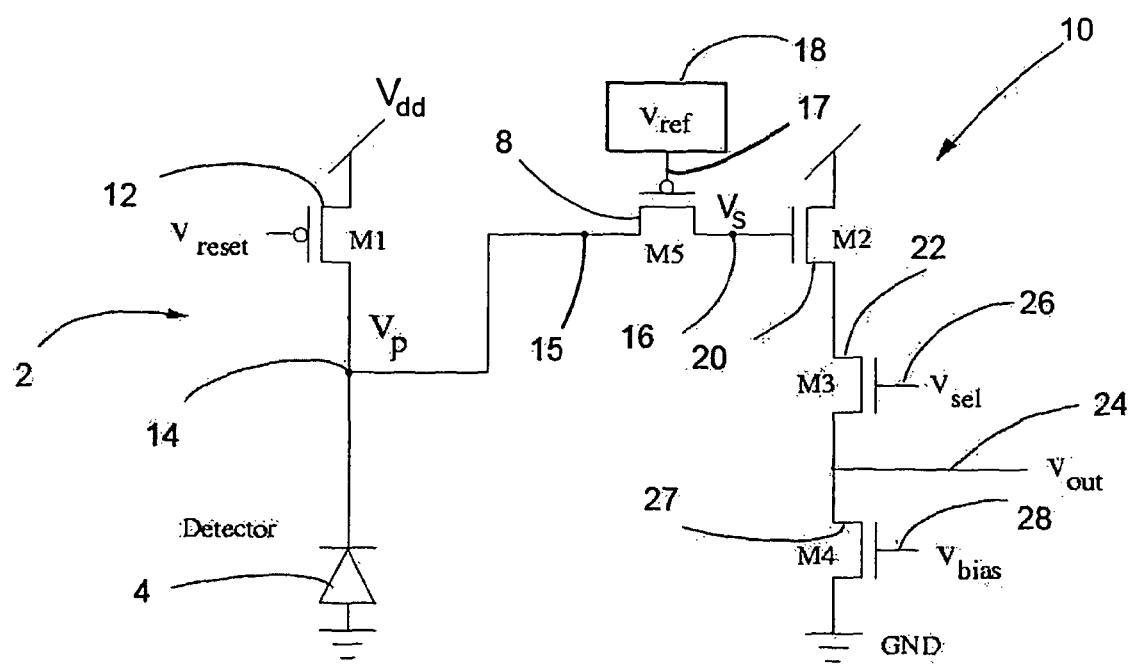
FIG. 1 is a schematic circuit diagram of a prior art pixel that forms part of an electronic image sensor.

The prior art HDR pixel shown in FIG. 1 is described in international patent application No. PCT/GB09/001235 (Publication No. WO20091141590A2), the contents of which are incorporated by reference herein. A CMOS image sensor for a camera conventionally includes an array of such pixels. FIG. 1 is a schematic circuit diagram of a single pixel 2 that forms part of an array. The pixel 2 includes a photosensor device 4, a transistor disconnect switch 8 (M5), a readout circuit 10 and a transistor reset switch 12 (M1).

The photosensor device 4 comprises a photodetector, for example a photodiode or phototransistor, having a small capacitance C. The required capacitance can be provided either by the intrinsic capacitance of the photodetector and other circuit components, or by a separate capacitor (not shown) connected in parallel with the photodetector. The photosensor device 4 provides an output signal at photosensor connection 14, which is represented by voltage $V_p$. This output signal is connected to a first terminal 15 of the transistor disconnect switch 8. The second terminal 16 of the disconnect switch 8 provides a readout connection for a readout voltage $V_s$ and is connected to the readout circuit 10. The gate terminal 17 of the disconnect switch 8 is connected to the output of a signal generator 18. In this pixel, the disconnect switch 8 is a p-channel MOSFET (metal oxide semiconductor field effect transistor), which only conducts when the gate voltage $V_{gate}$ is less than the source voltage $V_{source}$ minus the transistor threshold voltage $V_{th}$. When the gate voltage is equal to or greater than the source voltage minus the threshold voltage, the disconnect switch 8 ceases to conduct.

The reset switch 12 comprises another MOSFET transistor. In this example, the source terminal of the reset switch 12 is connected to a fixed power supply voltage $V_{dd}$, although it could alternatively be connected to a different voltage. The gate terminal is connected to receive a reset signal $V_{reset}$ and the drain terminal is connected to the photosensor device 4 through photosensor connection 14.

The signal generator 18 generates a time-dependent control signal represented by the reference voltage $V_{ref}$, which is connected to the gate of the disconnect switch 8 to control operation of the switch. When the reference voltage $V_{ref}$ applied to the gate is less than the photosensor voltage $V_p$ minus the threshold voltage $V_{th}$, the switch conducts, so applying the photosensor voltage $V_p$ to the readout circuit 10 via the readout connection 16. When the reference voltage $V_{ref}$ is greater than the photosensor voltage $V_p$ minus the threshold voltage $V_{th}$, the disconnect switch 8 ceases to conduct, thus isolating the readout circuit 10 from the photosensor voltage $V_p$.

The readout circuit 10 comprises a conventional selectable source follower read out circuit, which includes a source follower transistor 20 (M2), a select transistor 22 (M3), and an output node 24 for an output signal $V_{out}$, which is connected to the source connection of the select transistor 22. The readout circuit 10 is designed to sense the voltage $V_s$ at the readout connection 16 of the disconnect switch 8, without drawing any current from the output. The gate 26 of the select transistor 22 is connected to receive a select voltage $V_{sel}$ and in use selects which pixel in a row or column of pixels is connected to the output node 24. The source terminal of the select transistor 22 is also connected to a biasing transistor 27, which receives a biasing voltage $V_{bias}$ at the gate terminal 28.

In use, the image collection process is initiated by applying a low reset voltage $V_{reset}$ to the gate of the transistor reset switch 12, causing the switch to conduct. This applies a high voltage $V_{dd}$ to the photosensor 4, which then stores a charge owing to the capacitance C of the circuit components. The reset voltage then goes high and the reset switch 12 stops conducting, allowing the stored charge to discharge through the photodetector 4. The rate at which the charge discharges depends on the photocurrent $I_p$ through the photodetector 4, which in turn depends on the intensity of light incident on the photodetector. The voltage $V_p$ at photosensor connection 14 thus decreases at a rate that depends on the intensity of light falling on the photosensor 4.

At a time t after the reset voltage has gone high, the photosensor voltage $V_p$ will be given by the equation:

$$V_p = V_{dd} - I_p \cdot t/C$$

The photosensor 4 thus provides an output signal $V_p$ at photosensor connection 14 that is proportional to a time integral of the detected light intensity (the constant of proportionality being negative). The output signal $V_p$ of the photosensor 4 is applied to the input of the readout circuit 10 via disconnect switch 8 and the readout connection 16.

The signal generator 18 is constructed and arranged to generate a time dependent reference signal $V_{ref}$ that varies according to a predetermined function $V_{ref}(t)$. Various functions can be applied but generally the reference signal $V_{ref}$ will increase with time t.

The transistor disconnect switch 8 receives the photosensor signal $V_p$ at its first terminal 15 and the reference signal $V_{ref}$ at its gate terminal 17. The second terminal 16 of the transistor switch 8 provides a readout connection and is connected to the readout circuit 10. When the reference voltage $V_{ref}$ is less than the photosensor voltage $V_p$ minus the threshold voltage $V_{th}$ (i.e. when $V_{ref} < V_p - V_{th}$) the disconnect switch 8 will conduct, applying the photosensor signal $V_p$ to the readout circuit 10. However, when the reference voltage $V_{ref}$ is equal to or greater than the photosensor voltage $V_p$ minus the threshold voltage $V_{th}$ (i.e. when $V_{ref} \geq V_p - V_{th}$), the disconnect switch 8 will stop conducting, thus disconnecting the photosensor signal $V_p$ from the readout circuit 10. In other words, the readout circuit 10 is isolated from the photosensor at a capture moment, when the difference between the photosensor voltage $V_p$ and the reference voltage $V_{ref}$ is less than the threshold voltage $V_{th}$ (i.e. when $V_p - V_{ref} < V_{th}$). It should be noted that with p-channel MOSFETs, the threshold voltage is sometimes given as a negative number. The readout circuit 10 thus samples the photosensor signal $V_p$ at the capture moment and provides a read out signal at output node 24.

The output signals from all of the pixels in the image sensor array are fed to a conventional electronic processor (not shown), which digitises the signals and combines them to form an image file.

The operation of the prior art pixel shown in FIG. 1 is therefore based upon the integration of photogenerated charge onto the capacitance formed largely by the photodiode 4 and the gate of the source follower transistor 20. The reset transistor 12 resets the pixel voltage at the start of each integration period. Transistors 20, 22 and 27 form a conventional source follower readout circuit, with biasing transistor 27 shared by a column of pixels.

The unusual feature of this prior art pixel is the inclusion of the disconnect switch 8, which has been added to an otherwise convention pixel to provide an effective integration time that is dependent on the photocurrent. The disconnect switch 8 acts with the input voltage $V_{ref}$ to isolate the photodiode from the gate of the source follower transistor 20 at a time that depends upon the photocurrent and the input voltage $V_{ref}$. The advantage of this is that it stops the pixel output voltage from becoming saturated at high photocurrents and allows the user to control the response of the pixel.

Since the colour of an area of a scene is determined by the ratios of the responses of red, green and blue pixels, one way to preserve the colours of a scene while providing a high dynamic range is to use pixels with a logarithmic response. However there is a problem when trying to use the pixel shown in FIG. 1 to obtain a logarithmic response at very low photocurrents. This problem stems from the fact that operation of the pixel relies upon reducing the effective integration time. This mechanism can only be effective for photocurrents that are large enough to discharge the pixel by more than the amount needed to create a logarithmic response in the maximum integration time.

The typical pixel parameters used to obtain the results presented herein are taken from a pixel that has been manufactured on a standard 0.35 micron CMOS process. This pixel has an integration capacitance of 33 fF. It is assumed that the aim is to convert the output from the pixel to a digital word using a 10 bit analogue-to-digital converter (ADC) with a 2V input range. This combination of number of bits and input range mean that the least significant bit (LSB) in the digitised output voltage is equivalent to a change of approximately 2 mV. To use a 2V range to represent 6 decades means that the desired response has an output that changes by 333 mV/decade. This would mean that the LSB voltage is equivalent to a change in contrast of 1.4%. The minimum detectable photocurrent, $I_{min}$, for any integrating pixel is the photocurrent that causes a change of pixel voltage equivalent to a change of one LSB in the output voltage in the maximum integration time. This photocurrent can be calculated using $$I_{min} = C_{int} LSB\text{voltage} / T_{int}$$

where $C_{int}$ is the integration capacitance and $T_{int}$ is the maximum integration time. If this change in the pixel voltage, $\Delta V_p$, is to represent a logarithmic response then $$\Delta V_p = S \log_{10}(I_{ph}/I_{ref})$$

To ensure that the minimum photocurrent causes digital output of 0000000001 then the reference current for the logarithmic response must be $$I_{ref} = I_{min} 10^{-LSB\text{voltage}/S}$$

By definition the minimum detectable current will then change the pixel voltage by enough to represent a logarithmic response in the maximum integration time allowed. In fact, in real pixels there is a dark current that flows in parallel with the photocurrent and with the assistance of this dark current the minimum photocurrent will cause the required output change in less time than the maximum integration time. With a dark current $I_{dark}$ acting in parallel with the photocurrent $I_{ph}$ then the time needed for a photocurrent to change the pixel voltage enough to create a logarithmic output can be calculated using $$T_{int}(I_{ph}) = C_{int} S \log 10 (I_{ph}/I_{ref})(I_{ph} + I_{dark})$$

Figure 2:
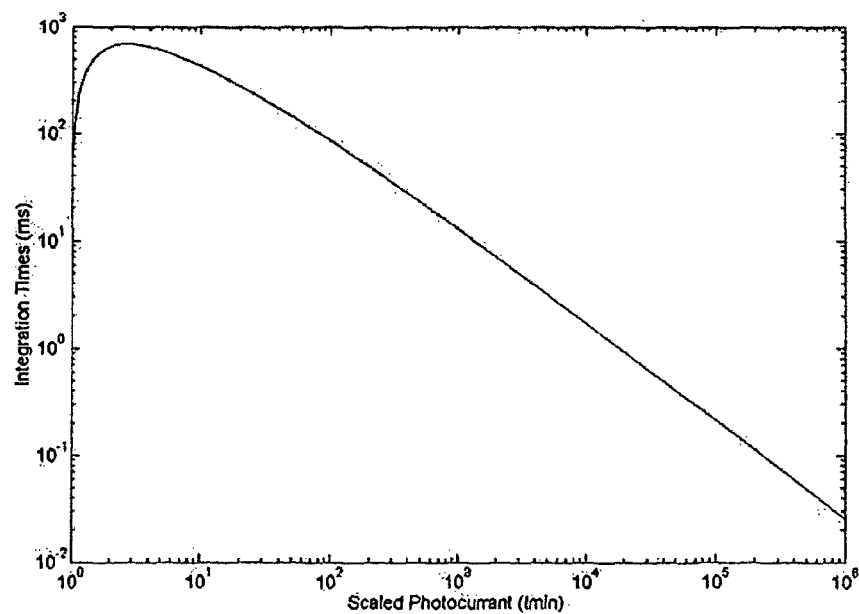
FIG. 2 is a graph showing the integration time typically needed to achieve a logarithmic response when the dark current is zero, for a pixel of the type shown in FIG. 1.

The times calculated using this expression for typical pixel parameters and assuming that the integration time is 20 ms are shown in FIG. 2.

The results in FIG. 2 show that there is a range of photocurrents, in this case less than approximately 500 $I_{min}$, that will not have sufficient time to change the pixel voltage enough to provide a logarithmic response. For small photocurrents the best that can be achieved with this pixel when its output is sampled after 20 ms is a linear response for photocurrents less than approximately 500 $I_{min}$ and a logarithmic response for higher photocurrents. This type of response will then require post processing in order to convert the whole response range into either a linear or a logarithmic response prior to further processing. This adds complexity and cost to the processing of the image. Alternatively the reference current can be set to a higher value than the ideal in order to reduce the voltage changes that are required. However this will result in pixel that has no response for a photocurrent less than approximately 20 $I_{min}$.

Figure 3:
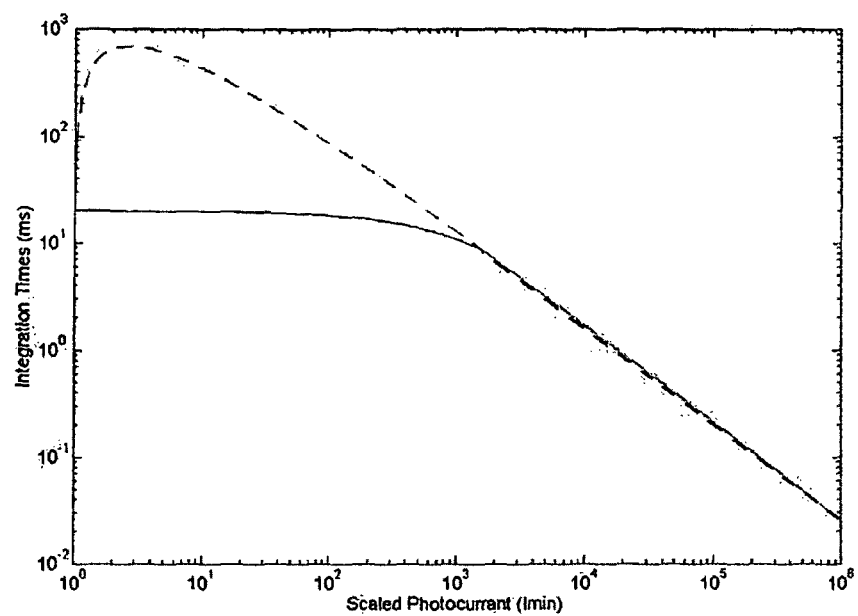
FIG. 3 is a graph showing (in broken line) the integration time needed to achieve a logarithmic response in the absence of a dark current and (in solid line) a possible user defined target time.

The fundamental problem is that the pixel voltage does not change enough in the time allowed to represent a logarithmic response. This problem can be solved by increasing the pixel voltage change at specific times. The aim when doing this must be to isolate the input of the source-follower transistor at a target time that is unique to each photocurrent. This target time must be a monotonic function of the photocurrent. For photocurrents larger than approximately 1000 $I_{min}$ the actual integration time is a useful target, Target time$(I_{ph}) = C_{int} S \log_{10}(I_{ph}/I_{ref})/I_{ph}$ In this case no action is needed and the existing design of pixel will work. However, for photocurrents less than approximately 1000 $I_{min}$ the peak in the actual integration time must be replaced by a monotonic function that matches the actual integration time at the boundary between the two regions. If the boundary time is $T_{bound}$ and this corresponds to a photocurrent $I_{bound}$ then a possible monotonic function that gives a maximum integration time at the lowest photocurrent is Target time$(I_{ph}) = T_{bound} + (T_{bound} - T_{int}) \tan h(\log_{10}(I_{ph}/I_{bound}))$ The results obtained with this function are shown in broken line in FIG. 3. As expected, the target time (shown in solid line) is a monotonic function of the photocurrent that matches the actual integration time at high photocurrents.

Figure 4:
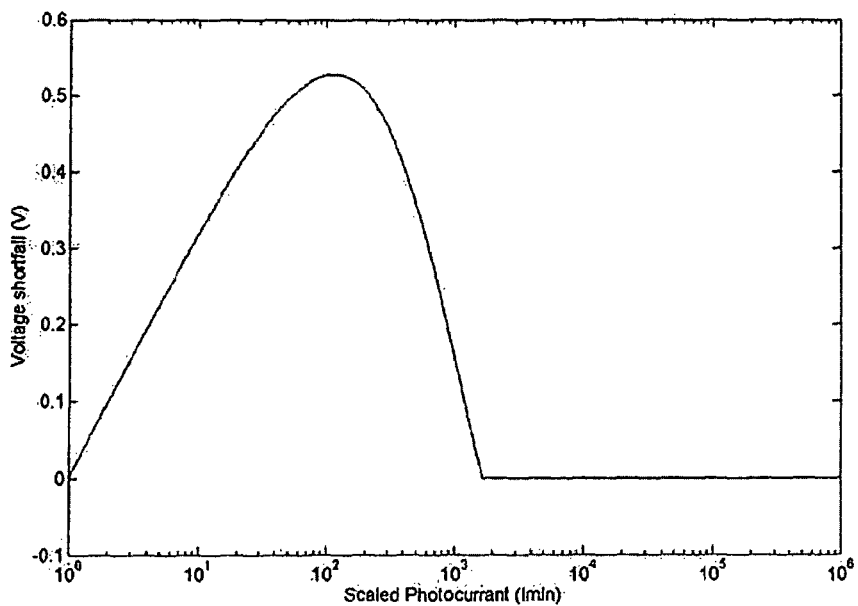
FIG. 4 is a graph showing the magnitude of the shortfall in the pixel voltage as a function of the photocurrent.

To achieve a logarithmic response the change in the pixel voltage must be equal to the change required to obtain a logarithmic response at the target time. The shortfall between the desired pixel voltage change and the actual the pixel voltage change when there is no dark current is shown in FIG. 4. As expected the shortfall only exists at the photocurrents for which the target integration time is shorter than the time needed for the photocurrent to change the pixel voltage enough to represent a logarithmic response.

Figure 5:
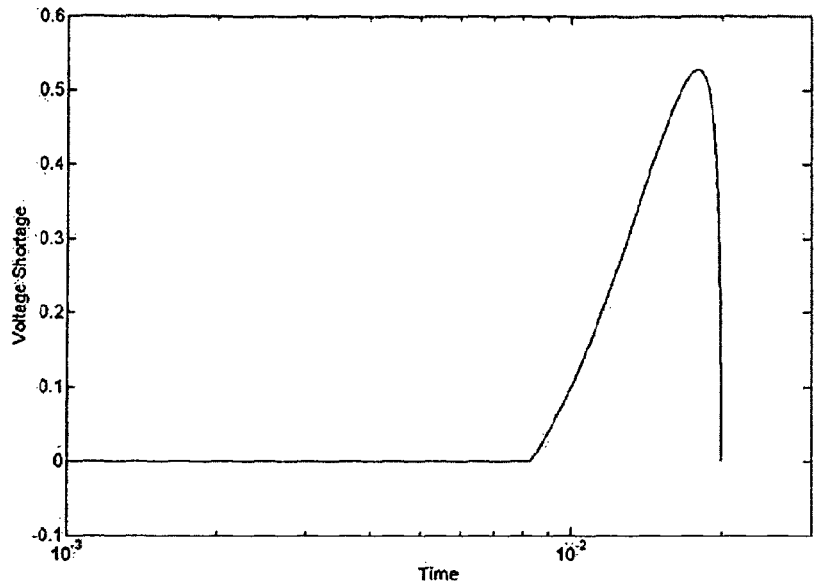
FIG. 5 is a graph showing the magnitude of the shortfall in the pixel voltage as a function of time when there is no dark current.

The magnitude of the shortfall in the change in pixel voltage as a function of time is shown in FIG. 5. One method of increasing the pixel voltage change by this amount is to apply a voltage with the time dependence shown in FIG. 5 to one side of an additional capacitance $C_{add}$ that is connected to the photosensor connection 14.

Figure 6:
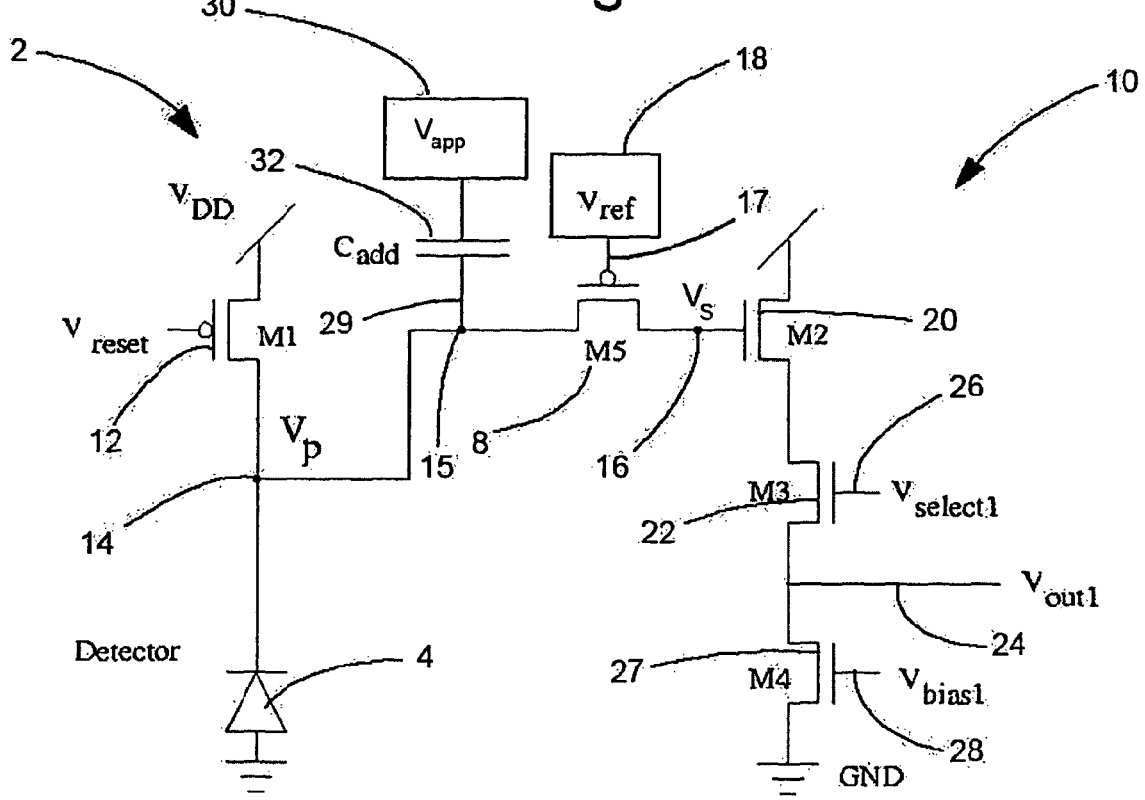
FIG. 6 is a schematic circuit diagram of a pixel that forms part of an electronic image sensor according to an embodiment of the invention.

This may be implemented for example using a pixel design as shown in FIG. 6, which depicts a pixel according to an embodiment of the invention. The pixel 2 includes an additional input 29 that is connected to the first terminal 15 of the disconnect switch 8. This additional input 29 is connected to a signal generator 30 via an additional capacitance $C_{add}$. This additional capacitance may be provided by an actual capacitor 32 as shown in FIG. 6 or for example by the use of a transistor with its source tied to its drain as the capacitance input and the gate connected to the first terminal 15 of the disconnect switch 8. In all other respects, the pixel is similar to the prior art pixel shown in FIG. 1 and described above. Therefore, to avoid repetition, the other features of the pixel will not be described.

The additional capacitance $C_{add}$ is used to ensure that the change in the pixel voltage, $V_p$, is suitable for creating a logarithmic response. The integration capacitance $C_{int}$ is not shown explicitly in FIG. 6: it is formed by the capacitances of various pixel components including the capacitance of the photodiode 4 and the gate capacitance of the source follower transistor 20.

The signal generator 30 generates an applied Voltage $V_{app}$ and the capacitance $C_{add}$ capacitively couples this applied voltage $V_{app}$ onto the integrating node of the pixel circuit (in this case, the first terminal 15 of the disconnect switch 8). In this pixel the photocurrent discharges the pixel voltage. This additional capacitance must therefore be used to apply a negative voltage to the integrating node, so as to decrease the pixel voltage when required.

The additional capacitance couples the applied voltage signal $V_{app}$ onto the integrating node, such that the voltage signal detected at the disconnect switch is the sum of the photosensor signal $V_p$ and a fraction of the applied signal $V_{app}$. Therefore, the time-dependent applied signal $V_{app}$ is selected such that the effect of the applied signal $V_{app}$ on the actual photosensor signal $V_p$ at the integrating node corresponds to the shortfall between the actual photosensor signal $V_p$ and a desired photosensor signal that represents the user-defined response to the intensity of light falling on the photosensor.

Figure 7:
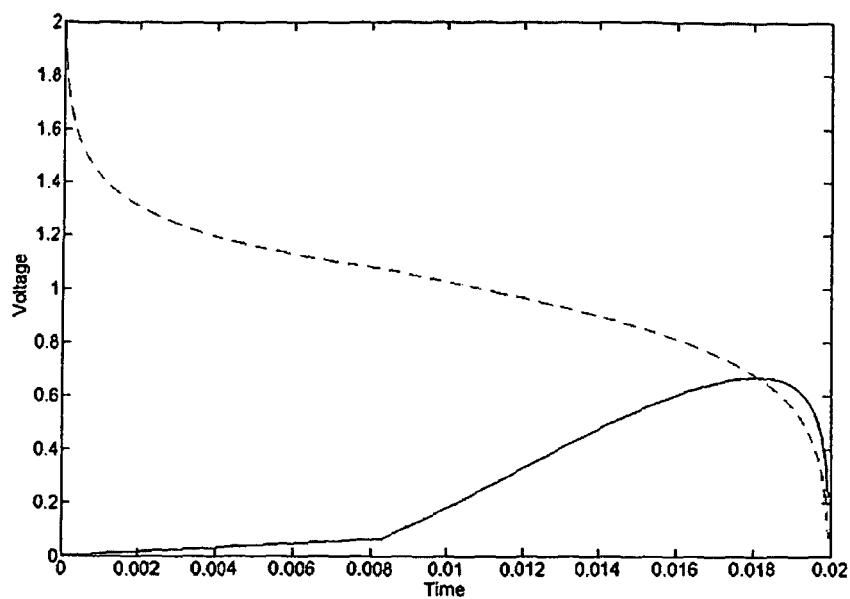
FIG. 7 is a graph showing (in broken line) the magnitude of the change in the pixel voltage at which the photodiode and the source follower circuit must be isolated as a function of time, and (in solid line) the magnitude of the change in pixel voltage corresponding to a photocurrent of 100 $I_{min}$.

If the capacitance of the pixel is $C_{int}$ and the magnitude of the shortage in the pixel voltage is $|V_{shortage}(t)|$ then the applied voltage must be $V_{app}(t) = -(C_{add} + C_{int}) |V_{shortage}(t)|/C_{add}$ The effect of using this additional mechanism to change the pixel voltage is shown in FIG. 7. This figure shows in solid line the predicted response of the pixel's integrating node to a photocurrent that is 100 times the minimum photocurrent. Without the additional contribution from the additional capacitance $C_{add}$ this photocurrent would not change the pixel voltage enough to be compatible with obtaining a logarithmic response. As these results show the applied voltage contribution makes a significant difference to the change in the pixel voltage. In particular it causes the pixel voltage change to be equal to the voltage change needed to represent a logarithmic response after approximately 18 ms. The reference voltage will be designed to ensure that at this point in time the source-follower transistor 20 is isolated from the photodetector 4.

Figure 8:
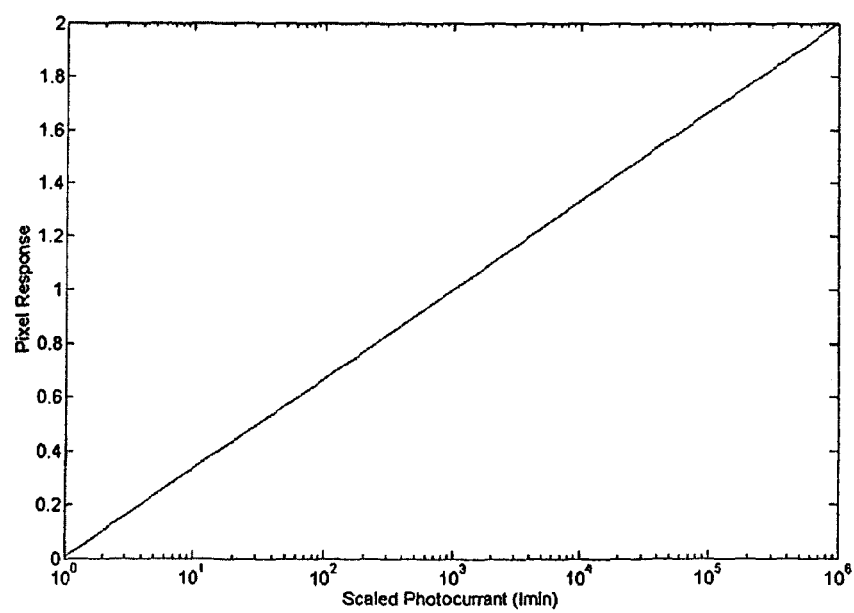
FIG. 8 is a graph showing the response of a pixel having an ideal logarithmic response over a whole range of photocurrents.

The response of a pixel such as the one shown in FIG. 6 with the correct voltage $V_{app}$ applied to the additional capacitance $C_{add}$ has been modelled using a mathematical modelling tool (MATLAB). The results in FIG. 8 show that with this additional capacitance it is possible to create a logarithmic response across the full range of photocurrents.

For simplicity the above description is based upon the assumption that the threshold voltage $V_{th}$ of the disconnect switch 8 is zero and the source-follower transistor 20 is ideal. In reality, these components will not provide such ideal behaviour. The methods that can be used to take these non-idealities into account have been described in international patent application No. PCT/GB09/001235 (publication no. WO2009/141590A2), the contents of which are incorporated by reference herein, and may be applied to the pixel described herein.

There is a second advantage to adding the capacitance $C_{add}$ into the pixel. The voltage $V_{ref}$ applied to the gate of the disconnect switch 8 is time dependent and a MOSFET such as the disconnect switch 8 will always contain a parasitic capacitance between its gate and both its source and its drain. The application of a time dependent voltage across a capacitance gives rise to a current. In the case of the pixel shown in FIG. 6 the increase in $V_{ref}$ as a function of the time needed to isolate the source follower transistor 20 can couple through this parasitic capacitance and increase the voltage on the integration node. This means that the combination of $V_{ref}$ and the parasitic capacitance will oppose the photocurrent that is discharging the integration capacitance. Although the parasitic capacitance is ideally zero the rate of change of $V_{ref}$ can be so large that for small photocurrents the voltage on the integration node increases rather than decreases during some or all of the integration period. Once the parasitic capacitance $C_{para}$ and the reference voltage $V_{ref}(t)$ are known this effect can be compensated for by using a slightly different applied voltage $V_{app}$. In particular, the extra component added to $V_{app}$ should be $-C_{para}V_{ref}(t)/C_{add}$, to cancel the effects of the undesirable parasitic capacitance.

Various modifications of the method and apparatus described above are of course possible. For example, in the circuit shown in FIG. 6, the photosensor connection 14 is connected directly to the first terminal 15 of the transistor disconnect switch 8. Alternatively, an additional transistor may be placed between the photosensor connection 14 and the first terminal 15, to extract current from the photosensor 4 whilst ensuring that the photosensor voltage remains largely unchanged. This provides a smaller effective integration capacitance and thus increases the sensitivity of the pixel to low light levels.

By selecting the form of the reference voltage $V_{ref}(t)$, the pixel is able to provide a user-defined response, for example a logarithmic response, a tone-mapping response or another monotonic non-linear response.

What is claimed is:

1. A high dynamic range pixel, comprising:
    a photosensor device for detecting incident light, said photosensor having a photosensor output for a photosensor signal $V_p$ that represents a time integral of the detected light intensity over an integration period,
    a transistor disconnect switch having a first switch input that is connected to the photosensor output, a second switch input that is connected to receive a time-dependent reference signal $V_{ref}$, and a switch output for a switch output signal $V_s$ that is switchably connected to the first switch input, the disconnect switch being constructed and arranged to disconnect the switch output from the first switch input at a capture moment that depends on the relative values of input signals at the first and second switch inputs, and
    a readout circuit connected to the switch output and arranged to capture the switch output signal $V_s$ at the capture moment and provide an output signal $V_{out}$ that is related to the switch output signal $V_s$;
    wherein the first switch input is connected additionally to an input for a time-dependent applied signal $V_{app}$, such that the input signal received at the first switch input during the integration period is the sum of the photosensor signal $V_p$ and the applied signal $V_{app}$.

2. A high dynamic range pixel according to claim 1, in which the first switch input is connected to a signal generator for generating the time-dependent applied signal $V_{app}$.

3. A high dynamic range pixel according to claim 2, wherein the first switch input is coupled to the signal generator via a capacitance $C_{add}$.

4. A high dynamic range pixel according to claim 1, wherein the time-dependent applied signal $V_{app}$ is selected such that the effect of the applied signal $V_{app}$ on the photosensor signal $V_p$ corresponds to a shortfall between the photosensor signal $V_p$ and a desired photosensor signal that represents a logarithmic response to the intensity of light falling on the photosensor.

5. A high dynamic range pixel according to claim 1, wherein the magnitude of the time-dependent applied signal $V_{app}$ is substantially zero during an initial part of each integration period, and non-zero in a later part of each integration period.

6. A high dynamic range pixel according to claim 1, wherein the disconnect switch is a MOSFET transistor.

7. A high dynamic range pixel according to claim 1, wherein the second switch input is connected to a signal generator for generating the time-dependent reference signal $V_{ref}$.

8. An image sensor including an array of high dynamic range pixels according to claim 1.

9. A method of sensing using a high dynamic range pixel comprising a photosensor having a photosensor output, a transistor disconnect switch having a first switch input that is connected to the photosensor output, a second switch input and a switch output, and a readout circuit connected to the switch output, the method comprising:
    detecting incident light with the photosensor and generating a photosensor signal $V_p$; generating a reference signal $V_{ref}$;
    comparing the photosensor signal and the reference signal; and
    determining a capture moment from the comparison and capturing an output signal,
    wherein a time-dependent applied signal $V_{app}$ is supplied to the first switch input such that the input signal received at the first switch input during the integration period is the sum of the photosensor signal $V_p$ and the applied signal $V_{app}$.

10. The method according to claim 9, wherein the time-dependent applied signal $V_{app}$ is supplied to the first switch input via a capacitance $C_{add}$.

11. The method according to claim 9, wherein the time-dependent applied signal $V_{app}$ is selected such that the effect of the applied signal $V_{app}$ on the photosensor signal $V_p$ corresponds to a shortfall between the photosensor signal $V_p$ and a desired photosensor signal that represents the voltage required to generate a logarithmic response within a predefined target time.

12. The method according to claim 11, wherein the predefined target time is a monotonic function of the photocurrent.

13. The method according to claim 9, wherein the magnitude of the time-dependent applied signal $V_{app}$ is substantially zero during an initial part of each integration period, and non-zero in a later part of each integration period.

14. The method according to claim 9 wherein the disconnect switch is a MOSFET transistor.

* * * * *